United States Patent
Lukas et al.

(10) Patent No.: US 11,827,101 B2
(45) Date of Patent: Nov. 28, 2023

(54) ELECTROMECHANICAL POWER-SPLIT SYSTEM AND METHOD OF OPERATING THE SAME

(71) Applicant: WINNING STEEL S.R.O., Brno (CZ)

(72) Inventors: Jan Lukas, Brno (CZ); Jakub Pospisil, Brno (CZ); Miroslav Lukes, Brno (CZ); Petr Nemec, Brno (CZ); Martin Kratky, Brno (CZ)

(73) Assignee: Winning Steel S.R.O., Brno (CZ)

( * ) Notice: Subject to any disclaimer, the term of this patent is extended or adjusted under 35 U.S.C. 154(b) by 0 days.

(21) Appl. No.: 17/926,734

(22) PCT Filed: Mar. 10, 2021

(86) PCT No.: PCT/CZ2021/050028
§ 371 (c)(1),
(2) Date: Nov. 21, 2022

(87) PCT Pub. No.: WO2021/239167
PCT Pub. Date: Dec. 2, 2021

(65) Prior Publication Data
US 2023/0191892 A1    Jun. 22, 2023

(30) Foreign Application Priority Data
May 28, 2020   (CZ) ................................ CZ2020-306

(51) Int. Cl.
*B60K 6/40*       (2007.10)
*B60K 6/365*     (2007.10)
(Continued)

(52) U.S. Cl.
CPC ................ *B60K 6/40* (2013.01); *B60K 6/365* (2013.01); *B60K 6/445* (2013.01); *B60K 6/543* (2013.01);
(Continued)

(58) Field of Classification Search
CPC .......... B60K 6/40; B60K 6/365; B60K 6/445; B60K 6/543; F16H 3/006; F16H 3/725; B60Y 2200/92
See application file for complete search history.

(56) References Cited

U.S. PATENT DOCUMENTS

| 8,262,530 | B2 | 9/2012 | Bailly et al. |
| 11,642,955 | B1 * | 5/2023 | Hwang ................. B60K 6/445 475/151 |

(Continued)

FOREIGN PATENT DOCUMENTS

| EP | 2253867 A1 | 11/2010 |
| WO | 2009047034 A1 | 4/2009 |

OTHER PUBLICATIONS

Int'l Search Report for PCT/CZ2021/050028, dated Jul. 20, 2021.

*Primary Examiner* — Bryan A Evans
(74) *Attorney, Agent, or Firm* — MaxGoLaw PLLC

(57) ABSTRACT

An electromechanical power-split system and a method of operating thereof is provided, with a mechanical drive branch including an internal combustion engine (3), and with an electric drive branch including a first motor-generator block (59) including a first motor-generator (1) and a second motor-generator block (60) including a second motor-generator (2), the first motor-generator (1) is connectable to the internal combustion engine (3) and to the second motor-generator (2). The system includes a planetary gearset (4) with dual planet gears (46) and four input/output members for altering the flow ratio of the mechanical and electric drive branch. Each dual planet gear (46) is connected to the four input/output members, which are a first pair of input/output members formed by a first sun gear (41) and a ring gear (44), and a second pair of input/output members formed by a second sun gear (43) and a planet carrier (45).

12 Claims, 6 Drawing Sheets

(51) Int. Cl.
  *B60K 6/445*  (2007.10)
  *B60K 6/543*  (2007.10)
  *F16H 3/00*   (2006.01)
  *F16H 3/72*   (2006.01)

(52) U.S. Cl.
  CPC ............ *F16H 3/006* (2013.01); *F16H 3/725* (2013.01); *B60Y 2200/92* (2013.01)

(56) References Cited

U.S. PATENT DOCUMENTS

| | | | |
|---|---|---|---|
| 11,642,956 B1* | 5/2023 | Hwang | B60K 6/40 475/5 |
| 2006/0189428 A1* | 8/2006 | Raghavan | B60K 6/365 475/5 |
| 2010/0081533 A1* | 4/2010 | Lee | B60K 6/365 475/5 |
| 2018/0361845 A1 | 12/2018 | Mueller et al. | |
| 2021/0354544 A1* | 11/2021 | Zhao | B60W 10/06 |
| 2021/0354549 A1* | 11/2021 | Zhao | B60W 20/13 |
| 2023/0074324 A1* | 3/2023 | Ma | B60K 6/44 |

\* cited by examiner

ELECTROMECHANICAL POWER-SPLIT SYSTEM AND METHOD OF OPERATING THE SAME

FIELD OF THE INVENTION

The invention relates to an electromechanical hybrid drive of power-split hybrid category, or to a transmission device of ECVT type (electronic continuously variable transmission), which is designed for a category of automobiles and trucks, buses, rail vehicles, agricultural, construction and special work machines or ships.

BACKGROUND OF THE INVENTION

Known solutions for planetary summation systems, also known as power-split hybrid drives (ECVT), use a planetary gearset (planetary differential) as the basic building block, into which constant speed of the internal combustion engine and the variable speed of the electric motor enter. The resulting output speed is then fed directly to the driven axle of the vehicle or are supplemented by a system of other planetary gears equipped with a system of clutches and brakes to achieve a greater number of speed stages and operating ranges. With regard to the number of used planetary gears, their disc or belt clutches and brakes, such solutions are complex and relatively expensive to manufacture.

A solution using a greater plurality of clutches and brakes increases overall transmission losses. These losses are caused by the friction of disengaged friction clutches and brakes, as well as by the relatively large moments of inertia of all clutches, the speed of which must increase or decrease when changing speed stages.

Known solutions of CVT, differential gearboxes with a hydrostatic branch, have a disadvantage of low efficiency of the variable hydrostatic branch. Therefore, it is advantageous to supplement such a gearbox with other gears in order to achieve higher mechanical efficiency.

The change in the sense of rotation of the output speed is achieved either by means of hydrostatic units, which, however, must have a considerable control range both on the side of the hydro-generator and on the side of the hydraulic motor, which in turn leads to a further reduction in efficiency. Or the reversion is realized by an additional mechanical transmission to ensure better efficiency.

The publication "BOSCH Automotive Handbook, R. Bosch GmbH, 2018" (p. 817, 818, 828 and 829) describes the architecture of electromechanical power-split hybrid systems, generally comprising a mechanical drive branch with an internal combustion engine, an electric drive branch with a first and a second motor-generator, a planetary gearset and an output shaft, wherein the first motor-generator is connectable to the mechanical drive branch. The planetary gearset ensures the power split, or power summation, and in the case of a planetary gearset with a sun gear, a ring wheel and single planet gears with a planet carrier, two modes of power split are described, either at the input or at the output. In the input power-split mode, the internal combustion engine and the first motor-generator form the inputs to the planetary gearset (e. g. the internal combustion engine for the planet carrier and the first motor-generator for the sun gear), whereas the second motor-generator forms the output of the planetary gearset (e. g. ring gear), and further connects to the output shaft. Conversely, in the output power-split mode, the internal combustion engine with the first motor-generator and the second motor-generator form the inputs to the planetary gearset, whereas the output shaft forms the output of the planetary gearset. Furthermore, the principle and conditions of power split between the mechanical and electric drive branches in ECVT type systems are described.

Chinese patent application CN 108215766 A discloses a three-range electromechanical power-split hybrid system with three power sources, a planetary gearset, three clutches, a brake and a reduction gear mechanism. Thus, the device comprises a first motor-generator (first power source), a second motor-generator (second power source), an internal combustion engine (third power source), a planetary gearset with dual planet gears, a reduction gear mechanism and an output shaft. The planetary gearset includes a ring gear connectable to the internal combustion engine, the brake, and the first motor-generator via a third clutch; a first sun gear connectable to the first motor-generator via a first clutch; a second sun gear connected to the second motor-generator; and dual planet gears with a dual planet carrier which is connectable on one side thereof to the first motor-generator via a second clutch and on the other side thereof connectable to the reduction gear mechanism, the output shaft, and further to a driven member. The device has three hybrid power splitting modes to adapt to different operating conditions and improve fuel consumption. Three ranges are achieved by switching and braking the individual members of the planetary gearset, which requires four switching/braking elements, thus increasing the complexity, cost and reducing the reliability of the entire system.

Japanese Patent Application JP 2010208584 A discloses a single-range electromechanical power-split hybrid system, comprising an internal combustion engine, a first motor-generator, a second motor-generator, a braking mechanism of the first motor-generator, a planetary gearset, and a transmission mechanism. The planetary gearset includes a ring gear connectable to the transmission mechanism, the second motor-generator, and a driven member; a sun gear connected to the first motor-generator and the braking mechanism thereof; and a single planet gear with a planet carrier connected to the internal combustion engine. Owing to the single operating range, both motor-generators must operate over a wide speed range. However, the area of their maximum efficiency is usually narrower. The maximum overall efficiency of the hybrid system is achieved only by using a purely mechanical power transmission, which is in this case only possible at one point (i. e. at a single vehicle speed).

This patent application further discloses a variant of a complex planetary gearset that includes a first and a second planetary gearset for connecting the first motor-generator to the braking mechanism thereof. The first planetary gearset includes a sun gear connectable to the first motor-generator, a single planet gear with a planet carrier connected to the input shaft (and further to the internal combustion engine) and a ring gear connected to the output shaft (and further to the transmission mechanism, the second motor-generator and a driven member). The adjoining second planetary gearset includes a ring gear connected to the single planet gear of the first planetary gearset, a dual planet gear with a planet carrier attached to the ring gear of the first planetary gearset, and a sun gear connectable to the braking mechanism of the first motor-generator.

U.S. Pat. No. 8,425,377 B2 discloses a two-range electromechanical power-split hybrid system, comprising a mechanical branch with an internal combustion engine, an electric branch with a generator, an electric motor and a traction battery, a planetary gearset and a geared transmission with a power output shaft. The planetary gearset includes a sun gear connectable to the generator via a brake, a single planet gear with a planet carrier connected to the internal combustion engine, and a ring gear connectable to the geared transmission via a first clutch. The geared transmission has two inputs—via the first clutch from the ring gear of the planetary gearset and via a second clutch from the electric motor, i. e. the electric motor is not directly connected to the planetary gearset. The system has two hybrid ranges, a mechanical reversal, the possibility of blocking the generator connected to the sun gear by the brake, which can in turn work as a motor-generator. The solution uses two inputs to the geared transmission, one of which is connected to a hybrid branch via a clutch and the other to an electric-only branch. The reversal is effectuated by a separate mechanism for changing the sense of the output speed. The number of components of the geared transmission is high in relation to the number of achieved speed stages, while a smooth change between speed stages is not possible.

US patent application US 2019093737 A1 discloses a multi-range electromechanical power-spilt hybrid system, comprising an internal combustion engine, a first electric motor, a second electric motor, an output shaft, and a complex planetary gearset with a first and a second planetary gear train interconnecting other system elements. A pair of planetary gear trains are interconnected, disengaged, or blocked by means of a system of clutches and brakes, or some planet gear members are blocked. However, this requires three or four friction clutches and/or brakes of considerably complicated shapes for interconnecting or blocking the members of said planetary gearsets.

SUMMARY OF THE INVENTION

It is an object of the present invention to provide an electromechanical power-split system which, in comparison with existing systems with a low number of operating ranges allows these to be increased and so as to increase efficiency, and in comparison with existing systems with a high number of operating ranges also allows higher efficiency due to simpler construction with fewer losses.

Another object of the present invention is to provide a method of operating the electromechanical power-split system described herein.

In the first aspect of the invention, said electromechanical power-split system has a mechanical drive branch comprising an internal combustion engine and an electric drive branch comprising a first motor-generator block including a first motor-generator, and a second motor-generator block including a second motor-generator, wherein the first motor-generator is connectable (fixedly, via a gear or by means of a clutch) to the internal combustion engine and is also connectable (electrically) with the second motor-generator. The essence of the present invention is the arrangement of the electromechanical power-split hybrid drive, which is novel in that a planetary gearset with a double input and a double output is used as a summation member for altering the flow ratio of the mechanical and electric drive branch. The input of the mechanical drive branch to the planetary gearset is represented by the internal combustion engine and the input of the electric drive branch to the planetary gearset is represented by the second motor-generator, although both inputs can be connected to the planetary gearset by additional shafts and/or gears.

Said planetary gearset comprises two planetary gear trains with dual planet gears and has four input/output members which are divided into two pairs, each dual planet gear being connected to all said four input/output members, wherein the "slash" symbol in the term "input/output" means that each input/output member is either an input or an output member. The first pair of input/output members is formed by a first sun gear and a ring gear, and the second pair of input/output members is formed by a second sun gear and a planet carrier. The planetary gearset may comprise at least two dual planet gears, e. g. two, three, four or more dual planet gears.

In general, it is possible to interconnect the four input/output members of the planetary gearset such that two members within one pair form the input from the internal combustion engine and the second motor-generator, while the remaining members within the second pair form then the output. Thus, with reference to the essence of the present invention, any one of said two pairs of the input/output members comprises two input members of the planetary gearset, one of the two input members being connectable to the internal combustion engine and the other of the two input members being connected to the second motor-generator, whereas the remaining other of said two pairs of the input/output members comprises two output members of the planetary gearset. Both output members form equivalent outputs from the planetary gearset, differing only in the representation of even and odd speed stages. The output members of the planetary gearset are connectable to a two-branch output block, and mechanically further via the output block to an output shaft, each of the output members being connectable to only one of the branches of the output block.

Given the equivalence of the output members and the split of the four input/output members into two pairs, there are a total of 4 combinations (marked by letters a) to d)) of the input members of the planetary gearset:
  a) the internal combustion engine is connectable to the first sun gear and the second motor-generator block is connected to the ring gear;
  b) the internal combustion engine is connectable to the ring gear and the second motor-generator block is connected to the first sun gear;
  c) the internal combustion engine is connectable to the second sun gear and the second motor-generator block is connected to the planet carrier;
  d) the internal combustion engine is connectable to the planet carrier and the second motor-generator block is connected to the second sun gear.

The system is provided with a pair of electric machines—the first and second motor-generator. The motor-generators are electrically connected and controlled by at least one frequency converter or regulator. The system can also be provided with a traction battery, which serves to increase the power of "Power boost" type or for recuperative energy storage or for an electric-only drive of the system when the internal combustion engine is stationary. The traction battery can be used for a combination of the above-mentioned functions and can also be charged when not driving, when a vehicle is stationary, from an external electrical network, being the so-called plug-in hybrid. A pair of electric machines (motor-generators), electrically interconnected and supplemented by available electrical accessories, thus form a control branch used to continuously alter the extent and the sense of revolutions, and thus the gear ratio of the entire electromechanical power-split system.

The electromechanical power-split system with two outputs using such an arrangement allows the output members of the planetary gearset to be connected to a double-flow gearbox, thus increasing the number of operating ranges, which in turn leads to optimization of speed stages of the first and second motor-generator, thereby achieving lower losses than the above-cited hybrid drives. Another advantage is the ability to keep the internal combustion engine in the mode of lowest specific fuel consumption and thus achieving a significant reduction in fuel consumption and $CO_2$ emissions, which is the main goal of hybrid drives. This arrangement is also advantageous in its simplicity of manufacture and relatively low number of components, so its manufacturing is bound to be less expensive than today's known hybrid solutions when comparing sophisticated propulsion systems, which is not least important in terms of energy and raw materials consumed for its production.

The output members of the planetary gearset are followed by a two-branch output block, which preferably comprises on the one hand a first branch clutch and a second branch clutch, and on the other hand a double-flow gearbox or a gear train. The output block is further mechanically connectable to the output shaft, which can be connected to a driven member, e. g. a vehicle axle, propeller, driven machine part, etc. Each of the output members is connectable to only one of the branches of the output block, wherein the first branch of the output block includes the first branch of the double-flow gearbox or gear train and the first branch clutch, whereas the second branch of the output block includes the second branch of the double-flow gearbox or gear train and the second branch clutch. It should be added that the first branch of the double-flow gearbox or gear train may comprise even speed stages and the second branch of odd speed stages, or conversely the first branch may comprise odd speed stages and the second branch of even speed stages, thus ensuring the equivalence of both output block branches within the kinematic system layout. The even and odd speed stages themselves differ only in the gear ratios, not in the kinematic arrangement.

The term "connectable" throughout the scope of this invention means a connection which can for one thing be fixed (e. g. a shaft and gear), rotatable (e. g. two gears), or removable or switchable (e. g. a clutch), for another it can be electric or mechanical or electromechanical, and for yet another it can be direct (two immediately adjacent elements) or indirect (two immediately non-adjacent elements).

In one embodiment, any one of the two output members of the planetary gearset is connected to the first branch clutch, while the remaining other of the two output members of the planetary gearset is connected to the second branch clutch, which are thus arranged in parallel. They are followed by the double-flow gearbox or a double-flow gear train, which are mechanically connectable to the output shaft. The term "gear train" means a simple gear train compared to a more complex double-flow gearbox.

In another embodiment, both output members of the planetary gearset are connectable to the double-flow gearbox or gear train. It holds that any one of the two output members is connected to one of the branches of the double-flow gearbox or gear train, while the remaining other of the two output members is connected to the other of the branches of the double-flow gearbox or gear train. The double-flow gearbox or gear train is followed by the first branch clutch and the second branch clutch, which can be arranged coaxially or in parallel and are mechanically connectable to the output shaft.

The use of the double-flow gearbox with the first branch clutch and the second branch clutch in these embodiments (compared to a gear train) increases the number of variable speed stages that can be changed under load, leading to an increase in the efficiency of the hybrid drive. The solution, which includes the double-flow gearbox, is particularly suitable for vehicles with a wide range of operating speeds.

For vehicles and work machines with a small range of operating speeds, the design of the output block is simpler in that it includes the first branch clutch, the second branch clutch and the gear train. In both of these embodiments, the output block is then connectable to the output shaft.

Due to the dimensions and the surrounding installation of the system, it is possible to arrange the first and second branch clutches ahead or behind the double-flow gearbox, or the gear train.

The electromechanical hybrid power-split system may further have, in order to minimise losses in the electric branch, the first and second motor-generator provided with a system of clutches and brakes of different design (wet or dry friction clutches, or clutches for torque gear train by form contact) with different control means (mechanical, hydraulic, pneumatic or electromagnetic). This introduces the terms of the "first motor-generator block" and the "second motor-generator block," comprising different variants of the embodiments described below.

In one embodiment, the first motor-generator block comprises the first motor-generator, a rotor of which is connected to the internal combustion engine and the planetary gearset fixedly or via a gear train. In an alternative embodiment, the first motor-generator block comprises the first motor-generator, the rotor of which is connected to the internal combustion engine and the planetary gearset by means of a first motor-generator rotor clutch. By disengaging the rotor of the first motor-generator from the internal combustion engine, it is possible to eliminate the magnetic losses caused by rotating the rotor together with the internal combustion engine at high speed in the operating modes when the first motor-generator is idle.

Either of the above two alternatives (i. e. fixed/via a gear train, or by means of a first motor-generator rotor clutch) can be supplemented by an internal combustion engine connecting clutch which can disengage the rotor from the internal combustion engine, thus allowing full use of the operating range of the double-flow gearbox of the output block in an electric-only operating mode, similarly to a hybrid operating mode, only the operation of the internal combustion engine being replaced in this arrangement by the operation of the first motor-generator.

The most complex variant of the first motor-generator block combines the advantages of the internal combustion engine connecting clutch and the first motor-generator rotor clutch, i. e. the elimination of magnetic losses in modes when the first motor-generator is idle as well as the possibility of using the full operating range of the output block in an electric-only operating mode, similarly to a hybrid operating mode, only the operation of the internal combustion engine being replaced by the operation of the first motor-generator.

Alternatively, either of the above two alternatives (i. e. fixed/via a gear train, or by means of a first motor-generator rotor clutch) may be supplemented by an internal combustion engine brake which can block the internal combustion engine. Owing to this brake, the system can be operated in an electric mode, where the electric-only operating mode is implemented with the help of the second motor-generator and the internal combustion engine brake replaces the brake torque of the first motor-generator, which saves power in this arrangement.

In one embodiment, the second motor-generator block comprises the second motor-generator, a rotor of which is connected to the planetary gearset fixedly or via a gear train.

In an alternative embodiment, the second motor-generator block comprises the second motor-generator, the rotor of which is connected to the planetary gearset by means of a second motor-generator rotor brake. This brake allows the mechanical locking of the rotor of the second motor-generator, which leads to power savings in those operating modes where the speed of the second motor-generator is zero, because the mechanical locking by means of the brake replaces the brake torque of the second motor-generator.

In general, it holds in all the above embodiments (4 combinations of input members, denoted by the letters a, b, c, d), as the speed of the second motor-generator increases, the speed trend for one of the two output members of the planetary gearset is upward (increasing) and for the other of the two output members of the planetary gearset downward (descending). The gear ratios of the first and second branches of the output block are such that during speed control of the second motor-generator, the speed trends of the first and second branches of the output block intersect at one point to allow a smooth transition between speed stages without rapidly changing speed and torque. In other words, the numbers of teeth of the first sun gear, the second sun gear, the ring gear and the dual planet gear are selected such that within the speed range of the second motor-generator at which the speed of the input member connected to the second motor-generator is lower or higher than the speed of the input member connected to the internal combustion engine, the speed of one output branch of the planetary gearset is higher than the speed of the input member connected to the internal combustion engine and the speed of the other output branch of the planetary gearset is, on the contrary, lower than the speed of the input member connected to the internal combustion engine. At the identical speed of the input member connected to the second motor-generator and the input member connected to the internal combustion engine, the speed of both output branches of the planetary gearset is also identical.

Another aspect of the present invention is a method of operating an electromechanical power-split system as described above, wherein:
  the planetary gearset summarises the input speed from the internal combustion engine and the input speed from the second motor-generator, wherein the two output members of the planetary gearset are connected to the output block and only one of the two branches of the output block is used to transfer power to the output shaft, whereas the other of the two branches of the output block is not used to transfer power to the output shaft; and
  the continuous change of the output speed from the output block is regulated by the change of the input speed from the second motor-generator.

The speed range of the output members of the planetary gearset, given by the speed control of the second motor-generator in combination with the individual gear ratios of the double-flow gearbox or gear train, thus gives the individual speed stages of the hybrid system. The term "using a branch of the output block for power transmission to the output shaft" means the engagement of the first or second branch clutch and, in the case of the double-flow gearbox, also of any one synchronizing clutch within that branch. The term "not using a branch of the output block for power transmission to the output shaft" means the disengagement of the first or second branch clutch and, in the case of the double-flow gearbox, also or alternatively any one synchronizing clutch within that branch.

Preferably, the input speed from the internal combustion engine in the planetary gearset is constant and the input speed from the second motor-generator in the planetary gearset is variable.

Preferably, the equalization of the input and output speeds of the first or second branch clutch which is disengaged, is further regulated by altering the input speed from the second motor-generator. After the equalization of the speed ahead and behind the disengaged clutch, the disengaged clutch is engaged and the engaged clutch is disengaged, thereby switching the clutches and shifting the speed stage without a step-like change in torque and in output speed from the output block and input speed from the internal combustion engine.

Preferably, the sense of rotation of the output speed of the output block at an odd operating range is reversed by controlling the sense of rotation of the second motor-generator in the range of negative values, whereas the sense of rotation of the output speed of the output block at an even operating range is reversed by controlling the sense of rotation of the second motor-generator. The term "speed control" means increasing or decreasing speed.

The sense of rotation changes already at the output of the planetary gearset by means of suitable speed control of the second motor-generator, which corresponds to the sense of rotation of an output shaft of the output block connected to the output shaft. The reversal of the speed of the output shaft of the output block thus takes place without the aid of additional devices such as gear trains with an inserted gear, switched by means of synchronizing clutches or wet or dry friction clutches.

In the embodiment with a stationary internal combustion engine (i. e. in an electric-only drive), both output members of the planetary gearset are driven only by the second motor-generator.

Alternatively, in the embodiment with a stationary internal combustion engine in combination with a disengaged internal combustion engine connecting clutch (i. e. in an electric-only drive), both output members of the planetary gearset are driven by the first and second motor-generators. A smooth change of output speed, shifting or reversing can be achieved in both hybrid and electric operating modes, when the internal combustion engine is stationary, and these operations are achieved by regulating the speed of the second motor-generator.

SUMMARY OF THE DRAWINGS

The invention is further illustrated by means of drawings, in which:

FIG. 4a shows an overall kinematic arrangement of one embodiment of an electromechanical hybrid power-split system, based on the combinations of FIGS. 2a and 3a;

FIG. 4b shows an overall kinematic arrangement of another embodiment of an electromechanical hybrid power-split system, based on the combinations of FIGS. 2b and 3a;

EXAMPLES OF THE INVENTION

The invention will be further illustrated on the basis of its exemplary embodiments with reference to the accompanying drawings. It is to be understood that the following descriptions are illustrative of the application of the principles of the present invention. In every case, it is possible to realise several mutually overlapping embodiments on the same principle, which embodiments may differ from each other by using or not using certain components, by interchanging the connection of an internal combustion engine 3 and a second motor-generator 2 with the individual inner members of a planetary gearset 4, or by using different number of speed stages and synchronizing clutches of a double-flow gearbox 32.

Figure 1:
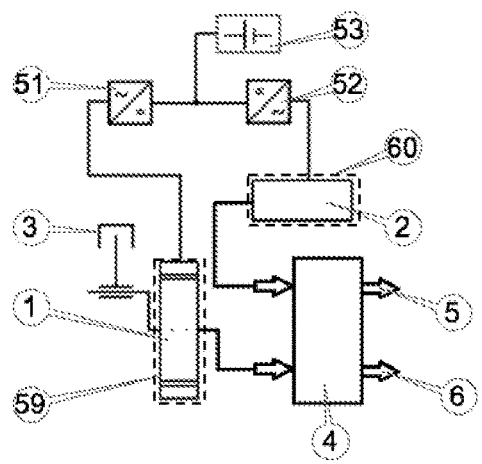
FIG. 1 shows the connection of the mechanical and electric drive branches with the planetary gearset serving to summarise the input speed of the internal combustion engine and the second motor-generator.

The general arrangement of the invention is shown in FIG. 1, which shows a mechanical drive branch with the internal combustion engine 3, an electric drive branch with a first motor-generator 1 and the second motor-generator 2 and the planetary gearset 4. In the electric branch, individual frequency converters 51, 52 and a traction battery 53 are connected between the first motor-generator 1 and the second motor-generator 2, the function of which electric branch is described below. The input of the mechanical drive branch to the planetary gearset 4 is represented by the internal combustion engine 3 and the input of the electric drive branch to the planetary gearset 4 is represented by the second motor-generator 2, whereas the output from the planetary gearset 4 to the two branches of the output block 38 is represented by the first branch clutch 5 and the second branch clutch 6.

The planetary gearset 4 according to the combinations in FIGS. 2a to 2d comprises two planetary gear trains with dual planet gears 46 and four input/output members, which are divided into two pairs. The first pair of input/output members is formed by a first sun gear 41 and a ring gear 44, and the second pair of input/output members is formed by a second sun gear 43 and a planet carrier 45.

Figure 2A:
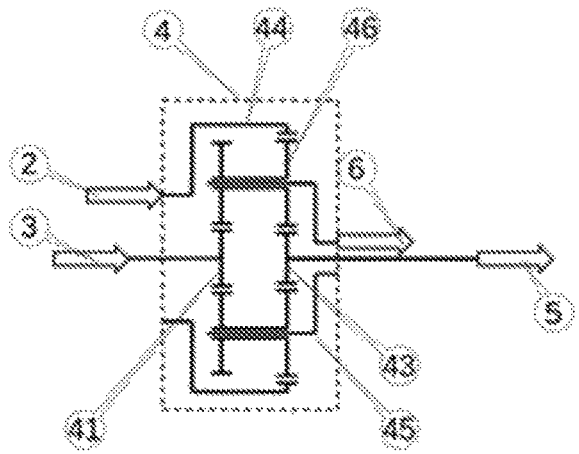
FIGS. 2a-d show the examples of interconnection (combination a, b, c, d) of the individual input/output members of the planetary gearset with elements representing the input from the internal combustion engine and the second motor-generator and the output to the first and second branch clutches.

In FIG. 2a, the internal combustion engine 3 is connected to the first sun gear 41 and the second motor-generator 2 is connected to the ring gear 44. The second sun gear 43 is connected to the first branch of the output block 38 and the planet carrier 45 is connected to the second branch of the output block 38, although in this case, the first and second branches of the output block 38 may be interchanged.

Figure 2B:
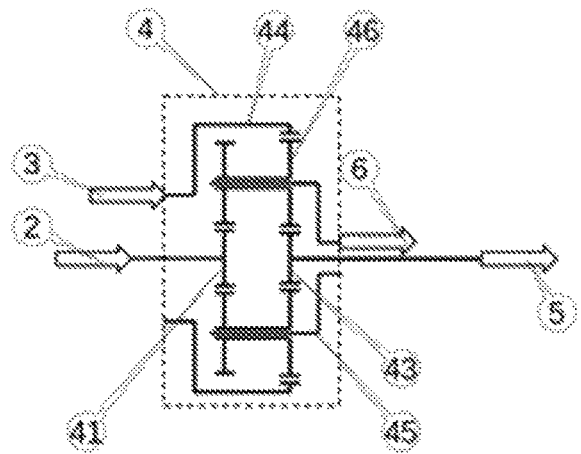

In FIG. 2b, the internal combustion engine 3 is connected to the ring gear 44 and the second motor-generator 2 is connected to the first sun gear 41. The second sun gear 43 is connected to the first branch of the output block 38 and the planet carrier 45 is connected to the second branch of the output block 38, although in this case, the first and second branches of the output block 38 may be interchanged.

Figure 2C:
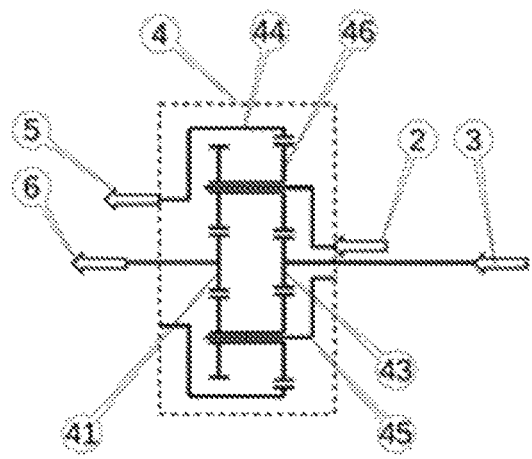

In FIG. 2c, the internal combustion engine 3 is connected to the second sun gear 43 and the second motor-generator 2 is connected to the planet carrier 45. The ring gear 44 is connected to the first branch of the output block 38 and the first sun gear 41 is connected to the second branch of the output block 38, although in this case the first and second branches of the output block 38 may be interchanged.

Figure 2D:
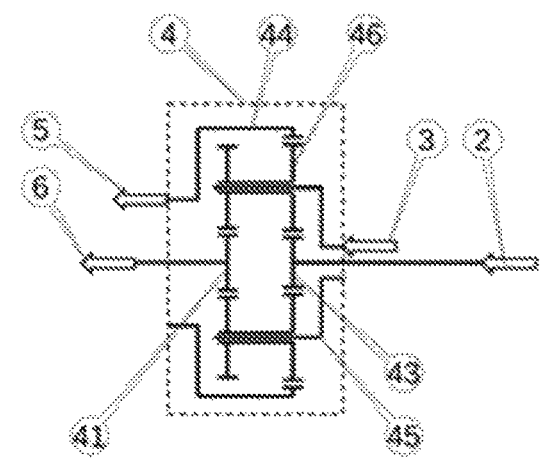

In FIG. 2d, the internal combustion engine 3 is connected to the planet carrier 45 and the second motor-generator 2 is connected to the second sun gear 43. The ring gear 44 is connected to the first branch of the output block 38 and the first sun gear 41 is connected to the second branch of the output block 38, although in this case the first and second branches of the output block 38 may be interchanged.

The output block 38 according to the combinations in FIGS. 3a to 3d comprises two branches, wherein the first branch of the output block 38 comprises a first branch of the double-flow gearbox 32 or gear train 33 and a first branch clutch 5, whereas the second branch of the output block 38 comprises a second branch of the double-flow gearbox 32 or gear train 33 and a second branch clutch 6. Each of the output members of the planetary gearset 4 is connectable to only one of the branches of the output block 38. A detail of the gear train 33 is shown in FIG. 3e, where a shaft A 35 and a shaft B 36 can be seen at the input, these being connected via their gears to the gear 37 on the output shaft 10.

Figure 3A:
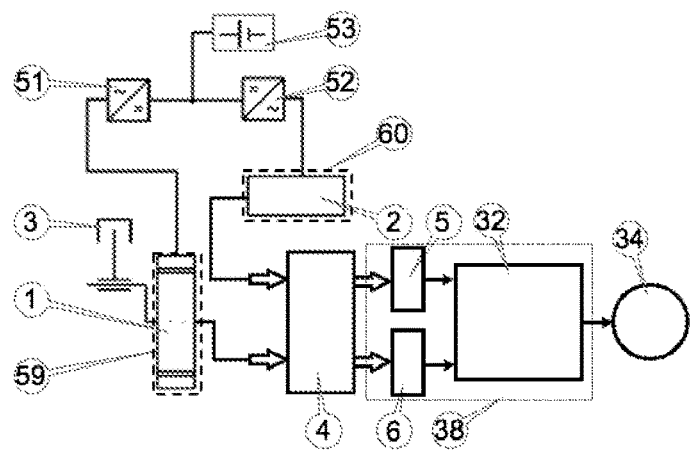
FIG. 3a shows a multi-range arrangement of the output block with the double-flow gearbox, where the output members of the planetary gearset are directly connected to the first and second branch clutches in a parallel arrangement.
Figure 3B:
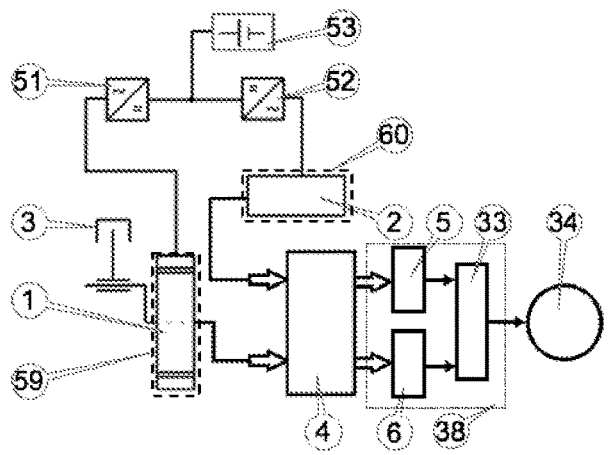
FIG. 3b shows a two-range arrangement of the output block with the gear train, where the output members of the planetary gearset are directly connected to the first and second branch clutches in a parallel arrangement.

In FIG. 3a, one of the two output members of the planetary gearset 4 is connected to the first branch clutch 5, whereas the remaining other of the two output members of the planetary gearset 4 is connected to the second branch clutch 6, which clutches are thus arranged in parallel. They are connected to the double-flow gearbox 32 with two branches, which gearbox is mechanically connectable to a driven member 34, e. g. a vehicle axle or a propeller. In FIG. 3b, the output block 38 is analogous to FIG. 3a, with the double-flow gearbox 32 being replaced by the gear train 33.

Figures 3C, 3D:
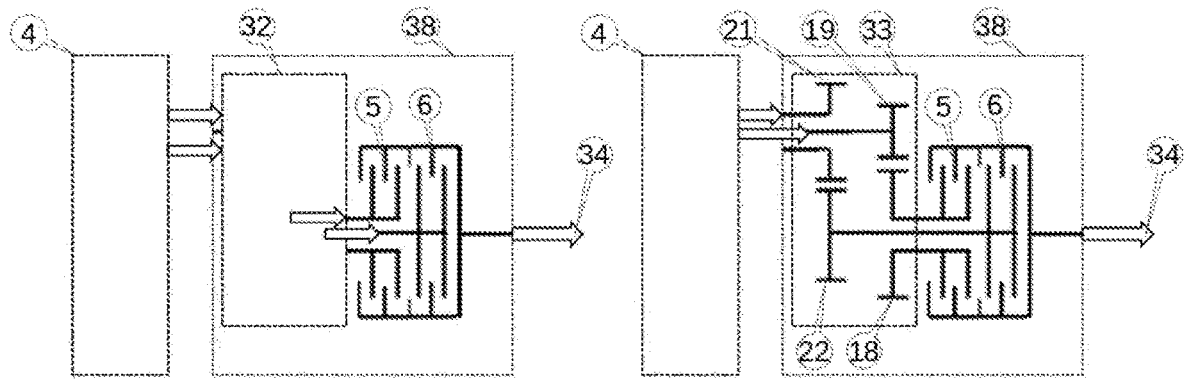
FIG. 3c shows a multi-range arrangement of the output block with the double-flow gearbox, where the output members of the planetary gearset are directly connected to the double-flow gearbox, and further to the first and second branch clutches in a coaxial arrangement.
FIG. 3d shows a two-range arrangement of the output block with the gear train, where the output members of the planetary gearset are directly connected to the gear train, and further to the first and second branch clutches in a coaxial arrangement.
Figure 3E:
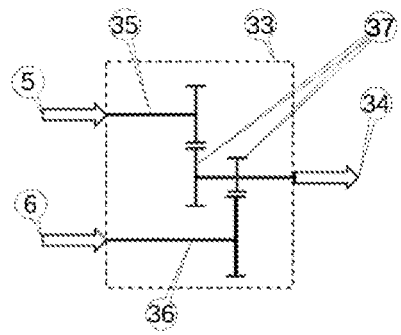
FIG. 3e shows a detail of the gear train of FIG. 3b, analogous to FIG. 3d.

In FIG. 3c, one of the two output members of the planetary gearset 4 is connected to one of the branches of the double-flow gearbox 32, whereas the remaining other of the two output members is connected to the other of the branches of the double-flow gearbox 32. The double-flow gearbox 32 is connected to the first branch clutch 5 and the second branch clutch 6, which clutches are arranged coaxially and are mechanically connectable to the driven member 34, e. g. a vehicle axle or a propeller. In FIG. 3d, the output block 38 is analogous to FIG. 3c, with the double-flow gearbox 32 being replaced by the gear train 33.

Figure 4A:
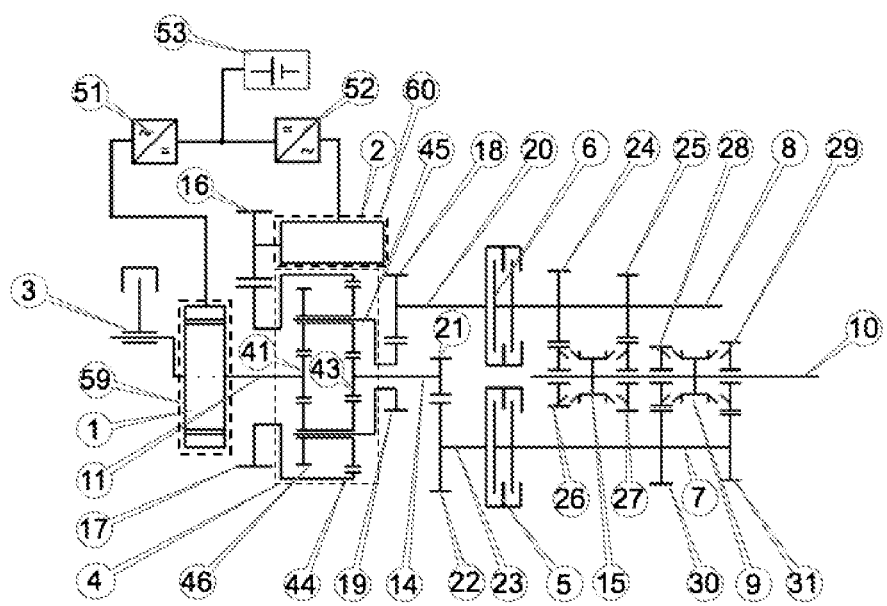

A particular embodiment of the invention corresponds to the arrangement according to FIG. 4a, where a kinematic diagram of an electromechanical hybrid drive of power-split hybrid category with two output shafts is shown, which diagram corresponds to a combination of the arrangements of FIGS. 2a and 3a. In this embodiment, the drive comprises the internal combustion engine 3 which is connected by means of a first shaft 11 to the first sun gear 41 of the planetary gearset 4 and ensures a constant branch of input speed.

The first motor-generator 1 is fixedly connected to the internal combustion engine 3 and serves as a source or consumer of power controlled according to the needs of the second motor-generator 2 or for recharging the batteries. It also enables an "E-power boost" function, which increases the input torque by combining the torques of the first motor-generator 1 and the internal combustion engine 3.

The second motor-generator 2 serves to alter (increase or decrease) the speed of the ring gear 44 of the planetary gearset 4, to which it is connected via a gear train formed by a gear 16 and a gear 17 and thus provides a variable branch of input speed.

The planetary gearset 4 serves to combine the inputs from the internal combustion engine 3 and the second motor-generator 2. It is provided with a pair of output members which form the planet carrier 45 connected via a gear formed by a gear 18 and a gear 19 to a fifth shaft 20, and the second sun gear 43 connected via a gear formed by a gear 21 and a gear 22 with a sixth shaft 23.

The fifth shaft 20 is connected to the second branch clutch 6 and the sixth shaft 23 is connected to the first branch clutch 5. Both of these clutches are used to alter the speed stage without interrupting the torque flow, thus enabling a further continuous increase or decrease in the output speed of the transmission in the next selected speed stage. Prior to the actual change of the speed stage, given by the alternation of the torque transmission between the second branch clutch 6 and the first branch clutch 5, a suitable upshift or downshift gear of the double-flow gearbox 32, i. e. odd speed stages and even speed stages.

Figure 4B:
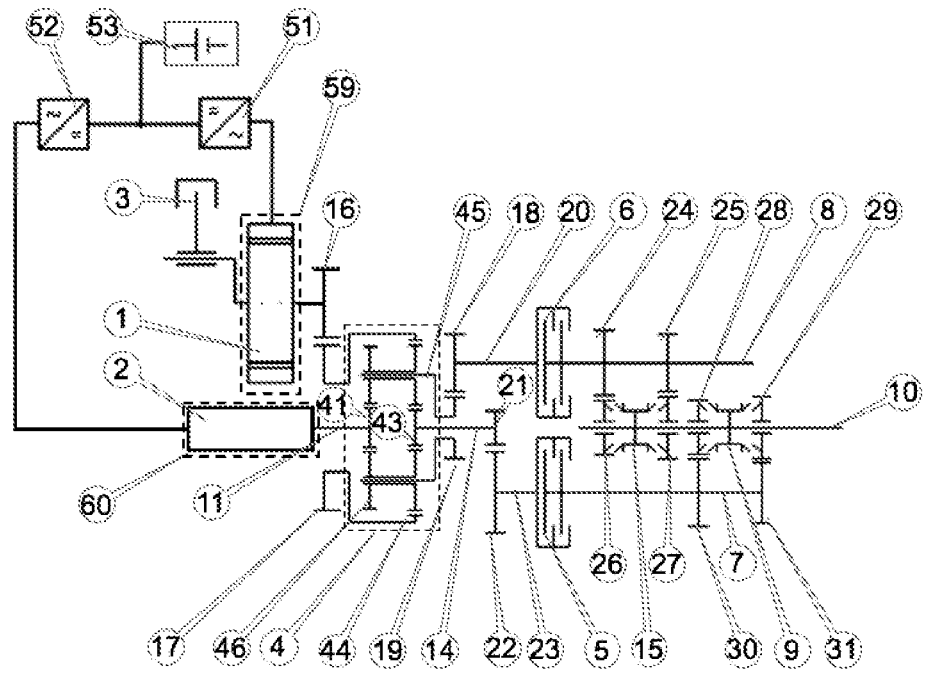
Figure 4C:
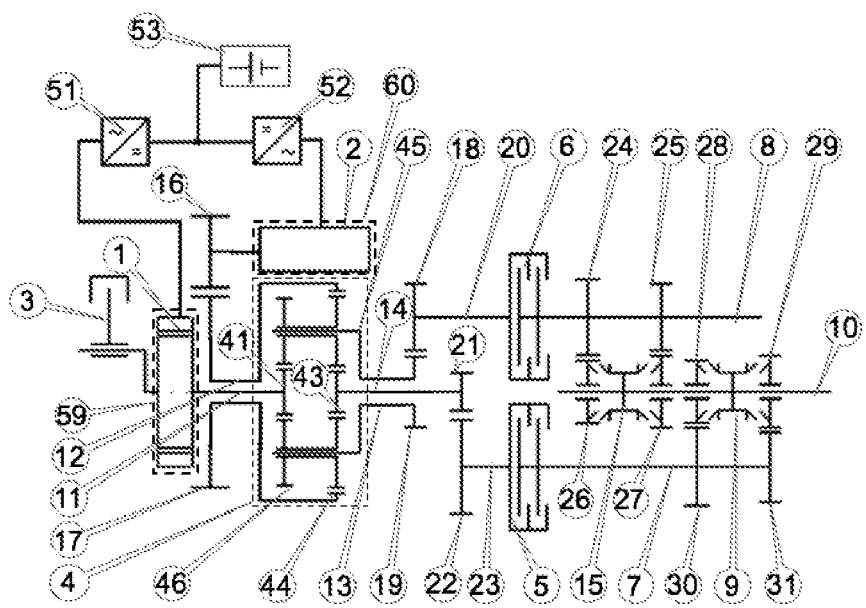
FIG. 4c shows an overall kinematic arrangement of one embodiment of an electromechanical hybrid power-split system, based on the combinations of FIGS. 2a and 3a, wherein all inputs and outputs from the planetary gearset are connected to the corresponding adjoining elements via two pairs of input and output shafts.

FIG. 4c shows the arrangement according to FIG. 4a, wherein the inputs and outputs of the planetary gearset 4 are extended by means of input shafts 11, 12 and output shafts 13, 14. In this arrangement, an input shaft 11 (a first shaft 11) is connected to the first sun gear 41, an input shaft 12 (a second shaft 12) to the ring gear 44, an output shaft 13 (a third shaft 13) to the planet carrier 45 and an output shaft 14 (a fourth shaft 14) to the second sun gear 43.

Analogously to FIG. 4a, FIG. 4b shows another specific embodiment with a kinematic diagram of an electromechanical power-split hybrid drive with two output shafts, which corresponds to the combination of the arrangement of FIGS. 2b and 3a. It differs from FIG. 4a only by the input of the internal combustion engine 3 to the ring gear 44 via a gear formed by a gear 16 and a gear 17, and by the input of the second motor-generator 2 to the first sun gear 41 by means of the first shaft 11. The constant and variable branch inputs of the input speed are switched within one pair of input/output members in the planetary gearset 4.

Figure 5A:
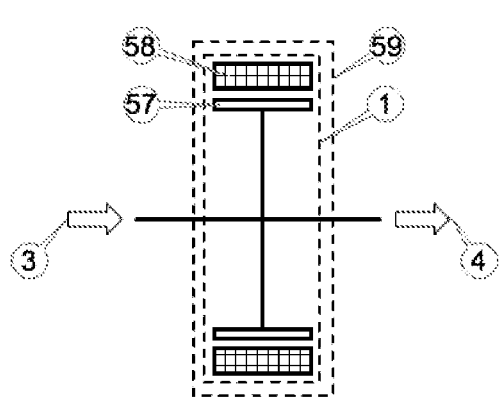
FIG. 5a shows a fixed connection of the first motor-generator with the internal combustion engine and the planetary gearset.
Figure 5E:
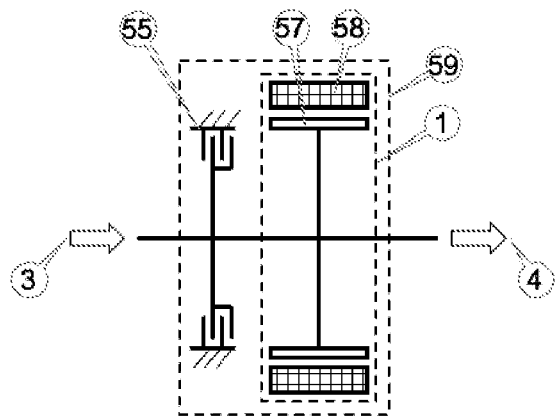
FIG. 5e shows a fixed connection of the first motor-generator to the internal combustion engine and the planetary gearset in combination with the internal combustion engine brake.
Figure 5B:
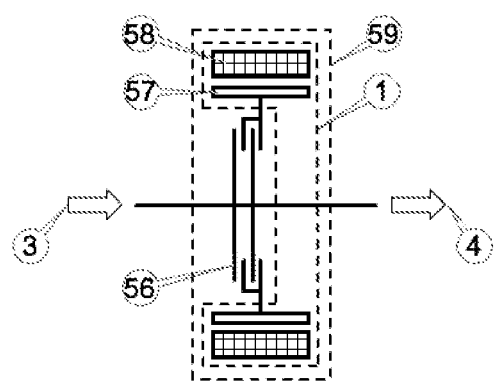
FIG. 5b shows a connection of the first motor-generator to the internal combustion engine and the planetary gearset by means of the first motor-generator rotor clutch.

FIGS. 5a to 5f show an embodiment of a first motor-generator block 59 comprising the first motor-generator 1 with a rotor 57 and a stator 58. The first motor-generator block 59 in the basic embodiment comprises a fixed connection of the first motor-generator 1 to the internal combustion engine 3 and the planetary gearset 4, see FIG. 5a. In FIG. 5b, the rotor 57 of the first motor-generator 1 can be disengaged from the internal combustion engine 3 by means of a first motor-generator rotor clutch 56, and thus eliminate magnetic losses caused by rotating the rotor together with the high speed internal combustion engine 3 in operating modes when the first motor-generator 1 is idle.

Figure 5F:
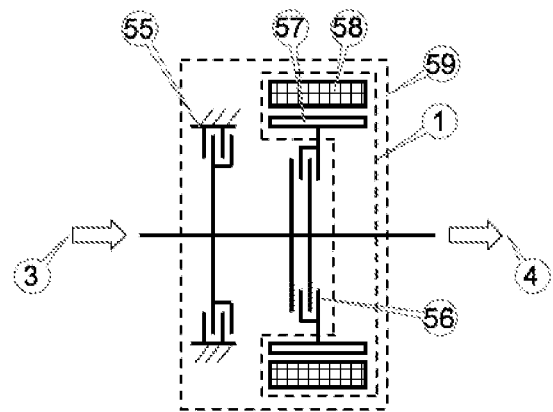
FIG. 5f shows a connection of the first motor-generator to the internal combustion engine and the planetary gearset by means of the first motor-generator rotor clutch in combination with the internal combustion engine brake.
Figure 5C:
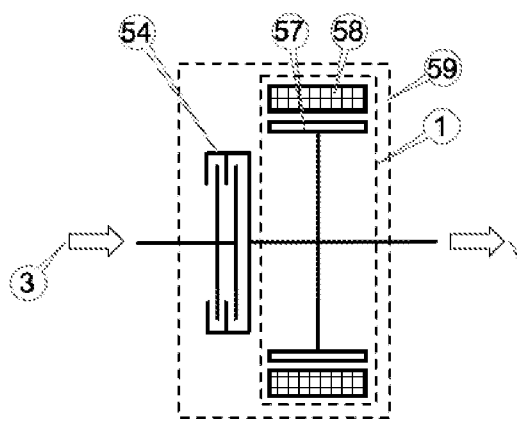
FIG. 5c shows a fixed connection of the first motor-generator to the planetary gearset in combination with the internal combustion engine connecting clutch to the first motor-generator.

The variant shown in FIG. 5c allows the internal combustion engine 3 to be disengaged by means of an internal combustion engine connecting clutch 54 so as to allow full utilization of the operating range of the double-flow gearbox 32 of the output block 38 in an electric-only operating mode, only the operation of the internal combustion engine 3 is replaced in this arrangement by the operation of the first motor-generator 1.

Figure 5D:
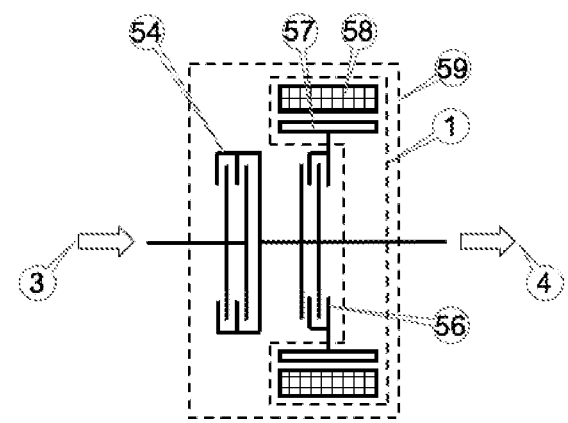
FIG. 5d shows a connection of the first motor-generator to the internal combustion engine and the planetary gearset by means of the first motor-generator rotor clutch in combination with the internal combustion engine connecting clutch to the first motor-generator.

The most complex variant of the first motor-generator block 59 is shown in FIG. 5d, where the advantages of the solutions described by FIGS. 5b and 5c can be combined by means of an arrangement comprising the internal combustion engine connecting clutch 54 and the first motor-generator rotor clutch 56, i. e. eliminating magnetic losses in modes where the first motor-generator 1 is idle and also having the possibility to use the full operating range of the double-flow gearbox 32 of the output block 38 in an electric-only operating mode, similar to a hybrid operating mode, only the operation of the internal combustion engine 3 is replaced by the operation of the first motor-generator 1.

The variants described in FIGS. 5a and 5b can be further supplemented by an internal combustion engine brake 55, see FIGS. 5e and 5f, owing to which it is possible to implement the system in an electric mode based on the original embodiment (FIGS. 5a, 5b), where an electric-only mode is realized by means of the second motor-generator 2 and the internal combustion engine brake 55 replaces the brake torque of the first motor-generator 1, owing to which power is saved in this embodiment.

Figure 6A:
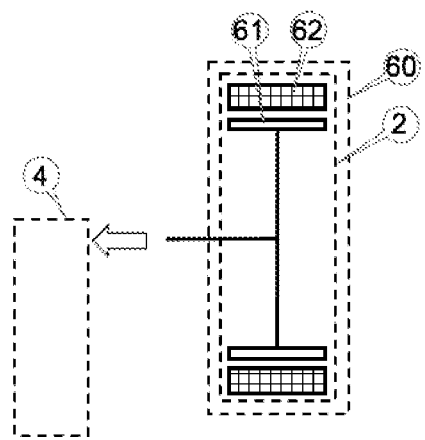
FIG. 6a shows a fixed connection of the second motor-generator to the planetary gearset.
Figure 6B:
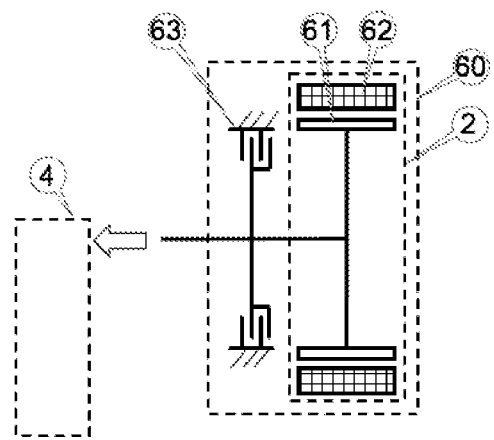
FIG. 6b shows a fixed connection of the second motor-generator to the planetary gearset in combination with the second motor-generator rotor brake.

FIGS. 6a and 6b show an embodiment of a second motor-generator block 60 comprising the second motor-generator 2 with a rotor 61 and a stator 62. The second motor-generator block 60 in the basic embodiment comprises a fixed or gear train connection of the rotor 61 of the second motor-generator 2 to the planetary gearset 4, see FIG. 6a. FIG. 6b shows a variant of the second motor-generator block 60 which, owing to a brake 63 of the rotor 61 of the second motor-generator 2, allows mechanical locking of the rotor 61 of the second motor-generator 2, which leads to power saving in those operating modes where the speed of the second motor-generator 2 is zero; The brake 63 replaces brake torque of the second motor-generator 2. In addition, the brake 63 allows operation with the use of the power of the internal combustion engine 3 only, which can be advantageously used for service purposes or in the event of a failure of the electric drive branch.

Description of Operating Modes

The invention allows operation in a hybrid mode, where the ratio of the power flow through the electric and mechanical drive branches changes during operation, or operation in an electric-only drive mode. In the hybrid mode, the internal combustion engine 3 is used for primary power generation, the electric drive mode uses the traction battery 53 as a propulsion power source. The traction battery 53 enables the "E-power boost" function with sufficient charge, where it supplies electric power to the frequency converter 51 of the first motor-generator 1 as well as to the frequency converter 52 of the second motor-generator 2 as the speed of the internal combustion engine 3 decreases and the load of the internal combustion engine 3 increases, and thus by means of the first motor-generator 1 and the second motor-generator 2 allows to achieve maximum drive power higher than the power of the internal combustion engine 3. It holds for both hybrid and electric modes that for even forward and reverse speed stages, the first branch clutch 5 and the synchronizing clutch 9 of the first branch are in operation. Furthermore, the second branch clutch 6 and the synchronizing clutch 15 of the second branch are in operation for odd speed stages. In the hybrid mode, the internal combustion engine 3, the first motor-generator 1 and the second motor-generator 2 are always in operation, both motor-generators operating according to the diagram described in the table below. In the electric mode, the internal combustion engine 3 is inactive and the first motor-generator 1 is in braking mode. Alternatively, in the electric mode, the internal combustion engine 3 is inactive and mechanically separated from the first motor-generator 1, which can thus be operated together with the second motor-generator 2. In both modes (hybrid and electric), this arrangement allows reversing the speed of the outputs of the planetary gearset 4 by controlling the speed of the second motor-generator 2. The function of the first motor-generator 1 in the hybrid mode depends on the need of the second motor-generator 2. In an alternative electric mode using the first motor-generator 1, where the first motor-generator 1 replaces the function of the internal combustion engine 3, the first motor-generator 1 is in a motor mode if the sense of the load is positive, while at a negative load the first motor-generator 1 is in a generator mode.

Example of Operation of the Invention

As an example of acceleration, a situation can be used where the gearbox operates with the second branch clutch 6 engaged in the first speed stage, where an eighth gear 25, which is part of an eighth shaft 8, is in permanent engagement with a co-engaging second gear 27 of the gearbox connected by the synchronizing clutch 15 of the second branch to the output shaft 10 of the gearbox.

At the same time, by means of the synchronizing clutch 9 of the first branch, the second gear 27 is engaged, which is realized by engaging a tenth gear 31, which is part of a seventh shaft 7 of the gearbox with a co-engaging fourth gear 29, which also engages the output shaft 10 of the gearbox. This is followed by alternating torque transmission from the second branch clutch 6 to the first branch clutch 5 without interrupting the torque flow, and the electronic speed control of the second motor-generator 2 continues to continuously increase the speed of the output shaft 10 of the gearbox with the second speed stage engaged.

When accelerating to a transition to the third and fourth speed stages, the situation is similar to that illustrated in the example above.

As an example of deceleration, a situation can be used where the gearbox operates with the first branch clutch 5 engaged in the fourth speed stage, where a ninth gear 30, which is part of the seventh shaft 7, is in permanent engagement with a co-engaging third gear 28 of the gearbox connected by the synchronizing clutch 9 of the first branch to the output shaft 10 of the gearbox.

At the same time, by means of the synchronizing clutch 15 of the second branch, the third speed stage is engaged, which is realized by engaging a seventh gear 24, which is part of the eighth shaft 8 of the gearbox with a co-engaging first gear 26, which also engages the output shaft 10 of the gearbox. This is followed by alternating torque transmission from the first branch clutch 5 to the second branch clutch 6 without interrupting the torque flow, and the electronic speed control of the second motor-generator 2 continues to continuously decrease the speed of the output shaft 10 of the gearbox with the third speed stage engaged.

Example of the Output Block

For machines with a low maximum speed, the arrangement of the output block 38 may be simpler in that it comprises only the first branch clutch 5, the second branch clutch 6 and the gear train 33. In this case, this would be a two-range embodiment. For vehicles with a higher maximum speed, the outputs of the planetary gearset 4 can be fed to the double-flow gearbox 32, which will allow the number of speed stages to be increased in order to increase the overall efficiency of the system for a given application.

Example of Controlling the Output Speed from the Output Block 38

The planetary gearset 4 is used to summarise the constant speed of the internal combustion engine 3 and the variable speed from the second motor-generator 2 and connects its two output members 43 and 45 to a pair of inputs 23 and 20 in the gearbox, where it allows shifting speed stages without a step-like change in the input and output speed by means of the first branch clutch 5 and the second branch clutch 6. Subsequent continuous change of the output speed occurs owing to the speed control of the second motor-generator 2.

When the internal combustion engine 3 is stationary, the drive of the fifth shaft 20 and the sixth shaft 23 is realized electrically only—by the second motor-generator 2. Alternatively, the drive of the fifth shaft 20 and the sixth shaft 23 is realized electrically only in combination with the internal combustion engine connecting clutch 54 being disengaged—by the first and second motor-generators 1, 2.

Example of Reversing the Output Speed from the Output Block 38

The reversal of the speed already takes place at the output of the planetary gearset 4 by means of suitable speed control of the second motor-generator 2. This changes the sense of rotation of the planet carrier 45 and the second sun gear 43 (see FIG. 4a) and thus also the output shaft 10 of the gearbox. The reversal of the speed of the output shaft 10 of the gearbox thus takes place without the aid of additional devices such as gears with an inserted gear switched by means of synchronizing clutches or wet or dry friction clutches.

The kinematic arrangement of the planetary gearset 4 according to FIG. 4a allows reversal of the speed of the planet carrier 45 and the second sun gear 43 of the planetary gearset 4. The reversal can be achieved in both hybrid and electric operating modes, when the internal combustion engine 3 is stationary, and reversing is achieved by suitable speed control of the second motor-generator 2.

Table of Basic Operating Modes for Forward and Reverse Drive with Positive Load

| mode | 3 | 1 | 2 | 53 | forward and reverse speed stage |
|---|---|---|---|---|---|
| hybrid | + | − | + | +/0/− | 1 |
|  | + | + | − | +/0/− | 2 |
|  | + | − | + | +/0/− | 3 |
|  | + | + | − | +/0/− | 4 |
| electric MG2 | 0 | B | + | + | 1 |
|  | 0 | B | + | + | 2 |
|  | 0 | B | + | + | 3 |
|  | 0 | B | + | + | 4 |

| mode | 3 | 1 | 2 | 53 | 54 | forward and reverse speed stage |
|---|---|---|---|---|---|---|
| electric MG1 + MG2 | 0 | + | + | + | 0 | 1 |
|  | 0 | + | − | + | 0 | 2 |
|  | 0 | + | + | + | 0 | 3 |
|  | 0 | + | − | + | 0 | 4 |

A positive load refers to a drive from which power is drawn on the output side (i.e. on the output shaft 10), whereas a negative load refers to a drive to which power is supplied on the output side (i.e. on the output shaft 10).

In the case of using the double-flow gearbox 32 in the output block 38:

| forward and reverse speed stage | 6 | 5 | 15 | 9 |
|---|---|---|---|---|
| 1 | 1 | 0 | 1 | 0 |
| 2 | 0 | 1 | 0 | 1 |
| 3 | 1 | 0 | 1* | 0 |
| 4 | 0 | 1 | 0 | 1** |

In the case of using the gear train 33 in the output block 38:

| forward and reverse speed stage | 6 | 5 |
|---|---|---|
| 1 | 1 | 0 |
| 2 | 0 | 1 |

Legend:

| | |
|---|---|
| + | motor mode of the motor-generators, conversion of electric power into mechanical energy, in case of the internal combustion engine 3 refers to a supply of mechanical energy to the system, in case of the traction battery 53 refers to a supply of power to the system |
| 0 | disengaged state |
| 1 | engaged state |
| − | brake, or generator mode of the motor-generators, conversion of mechanical energy into electric power, in case of the internal combustion engine 3 refers to energy consumption from the system (engine braking), in case of the traction battery 53 refers to energy consumption from the system by traction battery |
| B | the member is braked |
| * | the synchronizing clutch 15 is engaged in the third speed stage on the opposite side as in the first speed stage |
| ** | the synchronizing clutch 9 is closed in the fourth speed stage on the opposite side as in the second speed stage |

INDUSTRIAL APPLICABILITY

This type of electromechanical power-split system can be used to drive trucks, buses, rail vehicles, agricultural, construction and special work machines, as well as automobiles or ships.

LIST OF REFERENCE SIGNS

1 first motor-generator
2 second motor-generator
3 internal combustion engine
4 planetary gearset
5 first branch clutch
6 second branch clutch
7 seventh shaft
8 eighth shaft
9 first branch synchronisation clutch
10 output shaft of the output block 38
11 first shaft
12 second shaft
13 third shaft
14 fourth shaft
15 second branch synchronisation clutch
16 first gear
17 second gear
18 third gear
19 fourth gear
20 fifth shaft
21 fifth gear
22 sixth gear
23 sixth shaft
24 seventh gear
25 eighth gear
26 first gear of the double-flow gearbox 32
27 second gear of the double-flow gearbox 32
28 third gear of the double-flow gearbox 32
29 fourth gear of the double-flow gearbox 32
30 ninth gear
31 tenth gear
32 double-flow gearbox
33 gear train
34 driven member
35 shaft A with gears
36 shaft B with gears
37 gear of the output shaft 10
38 output block
41 first sun gear
43 second sun gear
44 ring gear
45 planet carrier
46 dual planet gear
51 frequency converter of the first motor-generator 1
52 frequency converter of the second motor-generator 2
53 traction battery
54 internal combustion engine connecting clutch
55 internal combustion engine brake
56 first motor-generator rotor clutch
57 first motor-generator rotor
58 first motor-generator stator
59 first motor-generator block
60 second motor-generator block
61 second motor-generator rotor
62 second motor-generator stator
63 second motor-generator rotor brake

The invention claimed is:

1. An electromechanical power-split system with a mechanical drive branch comprising an internal combustion engine (3), and with an electric drive branch comprising a first motor-generator block (59) including a first motor-generator (1) and a second motor-generator block (60) including a second motor-generator (2), wherein the first motor-generator (1) is connectable to the internal combustion engine (3) and to the second motor-generator (2), wherein the system comprises a planetary gearset (4) with dual planet gears (46) and four input/output members for altering the flow ratio of the mechanical and electric drive branch, wherein each input/output member is either an input or output member, wherein each dual planet gear (46) is connected to the four input/output members, which are a first pair of input/output members formed by a first sun gear (41) and a ring gear (44), and a second pair of input/output members formed by a second sun gear (43) and a planet carrier (45), wherein any one of said two pairs of input/output members comprises two input members of the planetary gearset (4), wherein one of the two input members is connectable to the internal combustion engine (3) and the other of the two input members is connected to the second motor-generator (2), whereas the remaining other of said two pairs of input/output members comprises two output members of the planetary gearset (4), wherein the output members of the planetary gearset (4) are connectable to a two-branch output block (38), and mechanically further via the output block (38) to an output shaft (10), wherein each of the output members is connectable to only one of the branches of the output block (38), wherein a rotor (61) of the second motor-generator (2) is connected to the planetary gearset (4) by means of a shaft characterised in that a second motor-generator rotor brake (63) is mounted on the shaft connecting the rotor (61) of the second motor-generator (2) and the planetary gearset (4).

2. The electromechanical power-split system according to claim 1, characterised in that the internal combustion engine (3) is connectable to the first sun gear (41) and the block (60) of the second motor-generator is connected to the ring gear (44).

3. The electromechanical power-split system according to claim 1, characterised in that the internal combustion engine (3) is connectable to the ring gear (44) and the block (60) of the second motor-generator is connected to the first sun gear (41).

4. The electromechanical power-split system according to claim 1, characterised in that the internal combustion engine (3) is connectable to the second sun gear (43) and the block (60) of the second motor-generator is connected to the planet carrier (45).

5. The electromechanical power-split system according to claim 1, characterised in that the internal combustion engine (3) is connectable to the planet carrier (45) and the block (60) of the second motor-generator is connected to the second sun gear (43).

6. The electromechanical power-split system according to claim 1, characterised in that the first branch of the output block (38) comprises a first branch of a double-flow gearbox (32) and a first branch clutch (5), whereas the second branch of the output block (38) comprises a second branch of the double-flow gearbox (32) and a second branch clutch (6).

7. The electromechanical power-split system according to claim 1, characterised in that the first branch of the output block (38) comprises a first branch of a gear train (33) and a first branch clutch (5), whereas the second branch of the output block (38) comprises a second branch of the gear train (33) and a second branch clutch (6).

8. The electromechanical power-split system according to claim 1, characterised in that a rotor (57) of the first motor-generator (1), is connected fixedly or via a gear train to the internal combustion engine (3) and the planetary gearset (4).

9. The electromechanical power-split system according to claim 1, characterised in that a rotor (57) of the first motor-generator (1), is connectable to the internal combustion engine (3) and the planetary gearset (4) by means of a first motor-generator rotor clutch (56).

10. The electromechanical power-split system according to claim 8, characterised in that the rotor (57) is further connectable to the internal combustion engine (3) by means of an internal combustion engine connecting clutch (54).

11. The electromechanical power-split system according to claim 1, characterised in that the numbers of teeth of the first sun gear (41), the second sun gear (43), the ring gear (44) and the dual planet (45) are selected such that in the speed range of the second motor-generator (2), at which the speed of the input member connected to the second motor-generator (2) is lower or higher than the speed of the input member connected to the internal combustion engine (3), the speed of one output branch of the planetary gearset (4) is higher than the speed of the input member connected to the internal combustion engine (3) and the speed of the other output branch of the planetary gearset (4) is lower than the speed of the input member connected to the internal combustion engine (3), wherein at identical speed of the input member connected to the second motor-generator (2) and the input member connected to the internal combustion engine (3), the speed of both output branches of the planetary gearset (4) is also identical.

12. The electromechanical power-split system according to claim 9, characterised in that the rotor (57) is further connectable to the internal combustion engine (3) by means of an internal combustion engine connecting clutch (54).

* * * * *